(12) United States Patent
Qiu et al.

(10) Patent No.: US 11,841,224 B2
(45) Date of Patent: Dec. 12, 2023

(54) AIR-GROUND INTEGRATED LANDSLIDE MONITORING METHOD AND DEVICE

(71) Applicant: Northwest University, Xi'an (CN)

(72) Inventors: Haijun Qiu, Xi'an (CN); Yaru Zhu, Xi'an (CN); Bingzhe Tang, Xi'an (CN); Shuyue Ma, Xi'an (CN)

(73) Assignee: NORTHWEST UNIVERSITY, Xi'an (CN)

( * ) Notice: Subject to any disclaimer, the term of this patent is extended or adjusted under 35 U.S.C. 154(b) by 0 days.

(21) Appl. No.: 17/875,472

(22) Filed: Jul. 28, 2022

(65) Prior Publication Data

US 2023/0228567 A1 Jul. 20, 2023

(30) Foreign Application Priority Data

Jan. 19, 2022 (CN) .......................... 202210060661.8

(51) Int. Cl.
- *G01C 11/02* (2006.01)
- *B64C 39/02* (2023.01)
- *B64D 47/08* (2006.01)
- *B64U 101/30* (2023.01)

(52) U.S. Cl.
CPC .............. *G01C 11/02* (2013.01); *B64C 39/02* (2013.01); *B64D 47/08* (2013.01); *B64U 2101/30* (2023.01)

(58) Field of Classification Search
None
See application file for complete search history.

(56) References Cited

U.S. PATENT DOCUMENTS

2014/0340427 A1* 11/2014 Baker .................. H04N 13/239
                                                           345/641
2020/0326187 A1* 10/2020 Ohhashi .................... G06T 7/20

* cited by examiner

*Primary Examiner* — Heather R Jones
(74) *Attorney, Agent, or Firm* — Gearhart Law, LLC; David Postolski

(57) ABSTRACT

Disclosed is an air-ground integrated landslide monitoring method and device. The monitoring method comprises the following steps: step one, performing high-precision (centimeter-level) vertical aerial photogrammetry and oblique photogrammetry on a monitored area by using an unmanned aerial vehicle, and quickly generating a digital topographic map, a digital orthographic map and a digital surface model; step two, performing accurate and intensive monitoring on the monitored area through a monitoring device; and step three, finally sending obtained data to a processor, and after the monitoring data are processed by the processor, sending the data to a remote-control center, so that real-time transformation and spatialization of dynamic landslide monitoring information are achieved. The present disclosure also provides a landslide monitoring device. The landslide monitoring device comprises a control box, a bottom plate and an unmanned aerial vehicle.

8 Claims, 4 Drawing Sheets

AIR-GROUND INTEGRATED LANDSLIDE MONITORING METHOD AND DEVICE

CROSS REFERENCE TO RELATED APPLICATION

This patent application claims the benefit and priority of Chinese Patent Application No. 202210060661.8, filed on Jan. 19, 2022, the disclosure of which is incorporated by reference herein in its entirety as part of the present application.

TECHNICAL FIELD

The present disclosure relates to the technical field of geological disaster monitoring, in particular to an air-ground integrated landslide monitoring method and device.

BACKGROUND ART

Landslides and related disasters, as complex natural phenomena, occur widely and frequently, resulting in a large number of economic losses and casualties in the world. With the continuous expansion of the range and scale of human activities, especially human engineering activities, destructive landslide events in China have significantly increased, and the harmfulness brought to society has gradually increased. Research on landslide prediction is always a theoretical and technical problem that experts and scholars in various subject fields of engineering geology, rock mechanics and the like in the world pay great attention to. The research work starts with how to predict and forecast the landslide and avoid various losses caused by the landslide.

However, the occurrence time, scale, development trend and the like of the landslide can be successfully predicted only by monitoring the landslide with enough precision and timely and accurately acquiring the feature information of the landslide, so that the purpose of disaster prevention and reduction is truly achieved. Therefore, basic data acquisition and monitoring in the first step play a fundamental guarantee and foundation role in the subsequent work.

According to different monitoring objects, landslide monitoring can be divided into four categories: displacement monitoring (ground absolute/relative/deep displacement monitoring), physical field monitoring (stress/strain/acoustic emission monitoring), underground water monitoring (underground water level, pore water pressure and soil moisture monitoring) and external induced factor monitoring (earthquake, rainfall and freeze-thaw monitoring). However, an existing landslide monitoring method is single, and a monitoring device can only monitor the landslide from the ground generally. Meanwhile, the monitoring mode cannot be adjusted according to the terrain, and therefore the landslide monitoring effect and the application range of the monitoring device are affected.

SUMMARY

Technical Problems to be Solved

The present disclosure aims to solve the problems that in the prior art, a landslide monitoring method is single, a monitoring device can only monitor from the ground generally, and meanwhile, the monitoring mode cannot be adjusted according to the terrain, and provides an air-ground integrated landslide monitoring method and device.

Technical Schemes

In order to achieve the above purpose, the present disclosure adopts the following technical scheme.

An air-ground integrated landslide monitoring method comprises the following steps:
step one, performing high-precision (centimeter-level) vertical aerial photogrammetry and oblique photogrammetry on a monitored area by using an unmanned aerial vehicle, and quickly generating a digital topographic map, a digital orthographic map and a digital surface model;
step two, performing accurate and intensive monitoring on the monitored area through a monitoring device located on a control box on the ground; and
step three, finally sending data obtained from the ground monitoring device and aerial photography of the unmanned aerial vehicle to a monitoring information processor, and after the monitoring data are processed by the processor, sending the data to a remote-control center through a communication module, so that real-time transformation and spatialization of dynamic landslide monitoring information are achieved.

Preferably, the obtained air-ground monitoring data are transmitted to the monitoring information real-time processor.

The present disclosure also provides an air-ground integrated landslide monitoring device comprises a control box, a bottom plate and an unmanned aerial vehicle, wherein the unmanned aerial vehicle is horizontally arranged above the bottom plate, the top of the control box is provided with a supporting groove corresponding to the bottom plate, one end of the control box is fixedly connected with a distance sensor, the control box is internally provided with a processor, a memory, a communication module, a power supply module and a positioning module, the top of the bottom plate is fixedly connected with a plurality of guide rods which are symmetrically arranged, a sliding cavity corresponding to the guide rod is formed in the bottom of the unmanned aerial vehicle, the end, located in the sliding cavity, of the guide rod is fixedly connected with a clamping block, the bottom of the unmanned aerial vehicle is fixedly connected with a plurality of supporting blocks, the supporting block is connected with the top of the bottom plate through a turnbuckle, one side of the unmanned aerial vehicle is fixedly connected with a bearing rod, the bottom of the bearing rod is rotatably connected with a camera, the camera is connected with the bearing rod through a telescopic air cylinder, and the two ends of the telescopic air cylinder are rotatably connected with the camera and the bearing rod respectively;

a device cavity is formed in one side of the unmanned aerial vehicle, a controller, a power supply, a signal receiver and a servo motor are sequentially arranged in the device cavity, the output end of the controller is connected with the input ends of the servo motor and the telescopic air cylinder, the output ends of the power supply and the signal receiver are both connected with the input end of the controller, the output ends of the power supply module, the positioning module and the distance sensor are all connected with the input end of the processor, the output end of the processor is respectively connected with the input ends of the communication module and the memory, and the output end of the communication module is connected with the input end of the signal receiver;

a through hole is formed in the inner wall of the device cavity, a baffle plate is rotatably connected to the through hole through a rotating shaft, a locking block is fixedly connected to the end, away from the rotating shaft, of the baffle plate, a sliding groove is formed in the outer wall of the unmanned aerial vehicle, a sliding rod is fixedly connected into the sliding groove, the sliding rod is slidably sleeved with an L-shaped clamping rod, a clamping groove corresponding to the L-shaped clamping rod is formed in the locking block, the sliding rod is provided with a first spring, and the two ends of the first spring are fixedly connected with the L-shaped clamping rod and the inner wall of the sliding groove respectively;

a mounting cavity is formed in the side, close to the device cavity, of the unmanned aerial vehicle, the output end of the servo motor penetrates through the inner wall of the device cavity and extends into the mounting cavity, the output end of the servo motor is fixedly sleeved with a first gear, a worm meshed with the first gear is rotatably connected into the mounting cavity, two symmetrically arranged screw rods are rotatably connected into the mounting cavity, and the screw rod is fixedly sleeved with a second gear meshed with the worm; and a mounting groove is formed in the top of the unmanned aerial vehicle, the end, away from the second gear, of the screw rod penetrates through the inner wall of the mounting cavity and extends into the mounting groove, the extending end of the screw rod is rotatably connected with the inner top of the mounting groove, the end, located in the mounting groove, of the screw rod is fixedly connected with a transmission block, the end, away from the screw rod, of the transmission block is fixedly connected with a supporting rod, the tops of the two supporting rods are fixedly connected through a driving motor, and the input end of the driving motor is fixedly connected with a rotor wing.

Preferably, the output end of the signal receiver is fixedly sleeved with a protective sleeve.

Preferably, a torsion spring sleeves the rotating shaft, and the two ends of the torsion spring are fixedly connected with the baffle plate and the inner wall of the through hole respectively.

Preferably, the output end of the servo motor is rotatably sleeved with a supporting sleeve, and one side of the supporting sleeve abuts against the inner wall of the mounting cavity.

Preferably, the signal receiver is an infrared wireless transmitter.

Preferably, a second spring is arranged on the guide rod, and the two ends of the second spring are fixedly connected with the bottom plate and the unmanned aerial vehicle respectively.

Preferably, the bottom of the bottom plate is fixedly connected with a plurality of protruding blocks.

Preferably, the bottom of the control box is rotatably connected with a plurality of universal self-locking wheels.

Beneficial Effects

Compared with the prior art, the present disclosure has the following advantages.

Firstly, in the present disclosure, the controller drives the servo motor to open. At the moment, the servo motor drives the worm to rotate through the first gear. Meanwhile, the worm drives the screw rod to rotate through the second gear so as to drive the transmission block to move. Meanwhile, the transmission block drives the driving motor to move up and down through the supporting rod to be folded or unfolded. Meanwhile, the distance between the bottom plate and the unmanned aerial vehicle can be adjusted through the turnbuckles.

Secondly, in the present disclosure, the sliding rod effectively prevents the bottom plate from shaking. The second spring can play a certain elastic supporting role on the bottom plate. Meanwhile, the clamping block can prevent the guide rod from falling off from the sliding cavity. Through the arrangement of the unmanned aerial vehicle and the ground monitoring device, the device can perform landslide monitoring in the air and on the ground at the same time. Therefore, the application range of the monitoring device is widened.

Thirdly, in the present disclosure, when the rotor wing needs to be folded, the signals can be sent to the signal receiver, and meanwhile, the signal receiver controls the servo motor through the controller. Meanwhile, the supporting sleeve can effectively prevent the output end of the servo motor from shaking. Meanwhile, the L-shaped clamping rod can be pulled, then the baffle plate is opened, and the control elements in the device cavity are maintained. Meanwhile, the torsion spring can play a certain torsional supporting role on the baffle plate. The protective sleeve can play a certain protection role on the signal receiver, and meanwhile, the first spring can play a certain elastic supporting role on the L-shaped clamping rod.

Reference signs: 1, bottom plate; 2, unmanned aerial vehicle; 3, guide rod; 4, sliding cavity; 5, clamping block; 6, supporting block; 7, turnbuckle; 8, device cavity; 9, controller; 10, power supply; 11, signal receiver; 12, servo motor; 13, through hole; 14, rotating shaft; 15, baffle plate; 16, locking block; 17, sliding groove; 18, sliding rod; 19, L-shaped clamping rod; 20, first spring; 21, mounting cavity; 22, first gear; 23, worm; 24, screw rod; 25, second gear; 26, mounting groove; 27, transmission block; 28, supporting rod; 29, driving motor; 30, rotor wing; 31, protective sleeve; 32, supporting sleeve; 33, second spring; 34, protruding block; 35, control box; 36, supporting groove; 37, distance sensor; 38, processor; 39, memory; 40, communication module; 41, power supply module; 42, positioning module; 43, bearing rod; 44, camera; 45, telescopic air cylinder; and 46, universal self-locking wheel.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure.

Embodiment I

Figure 1:
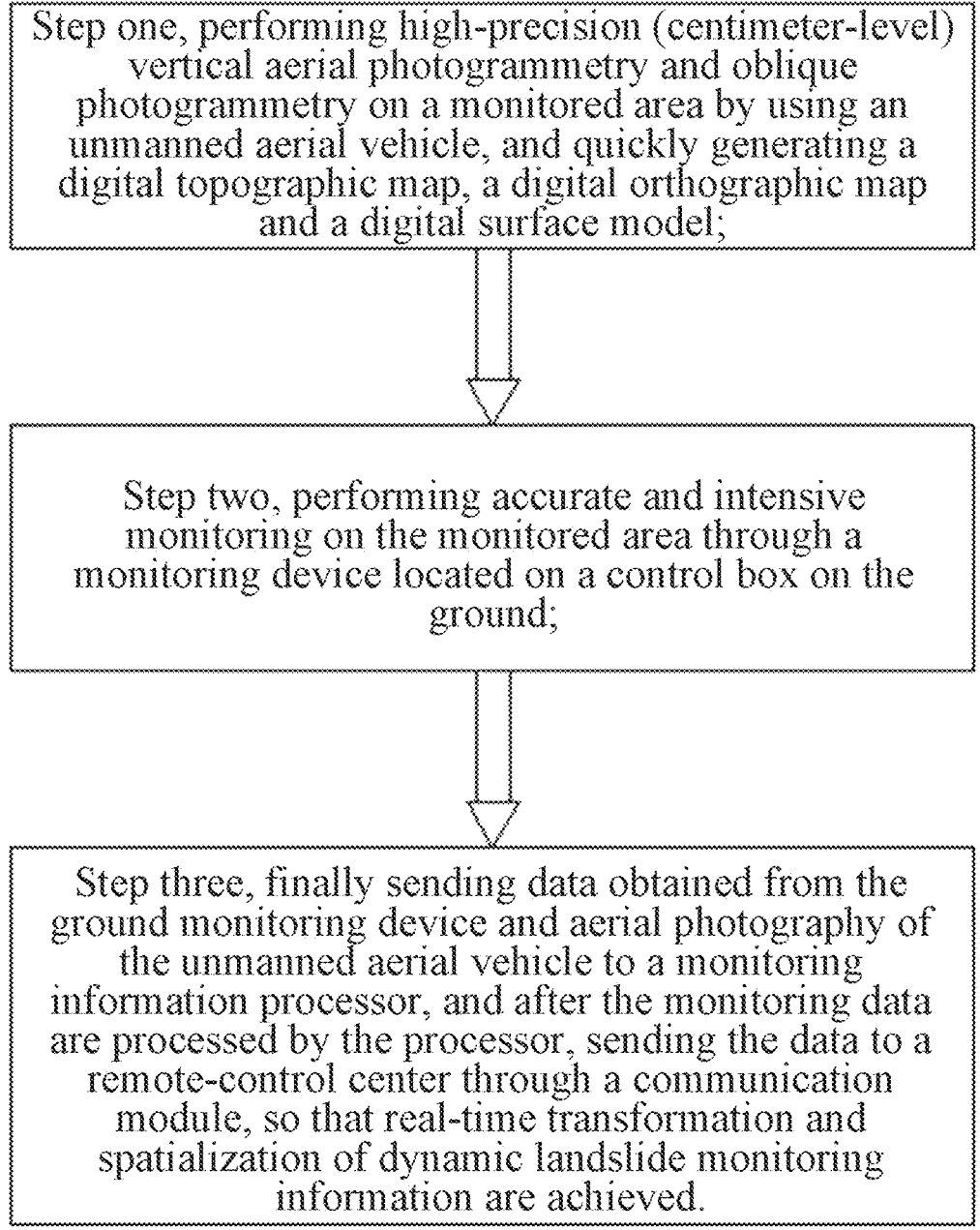
FIG. 1 is a flow schematic diagram of an air-ground integrated landslide monitoring method provided by the present disclosure.
Figure 2:
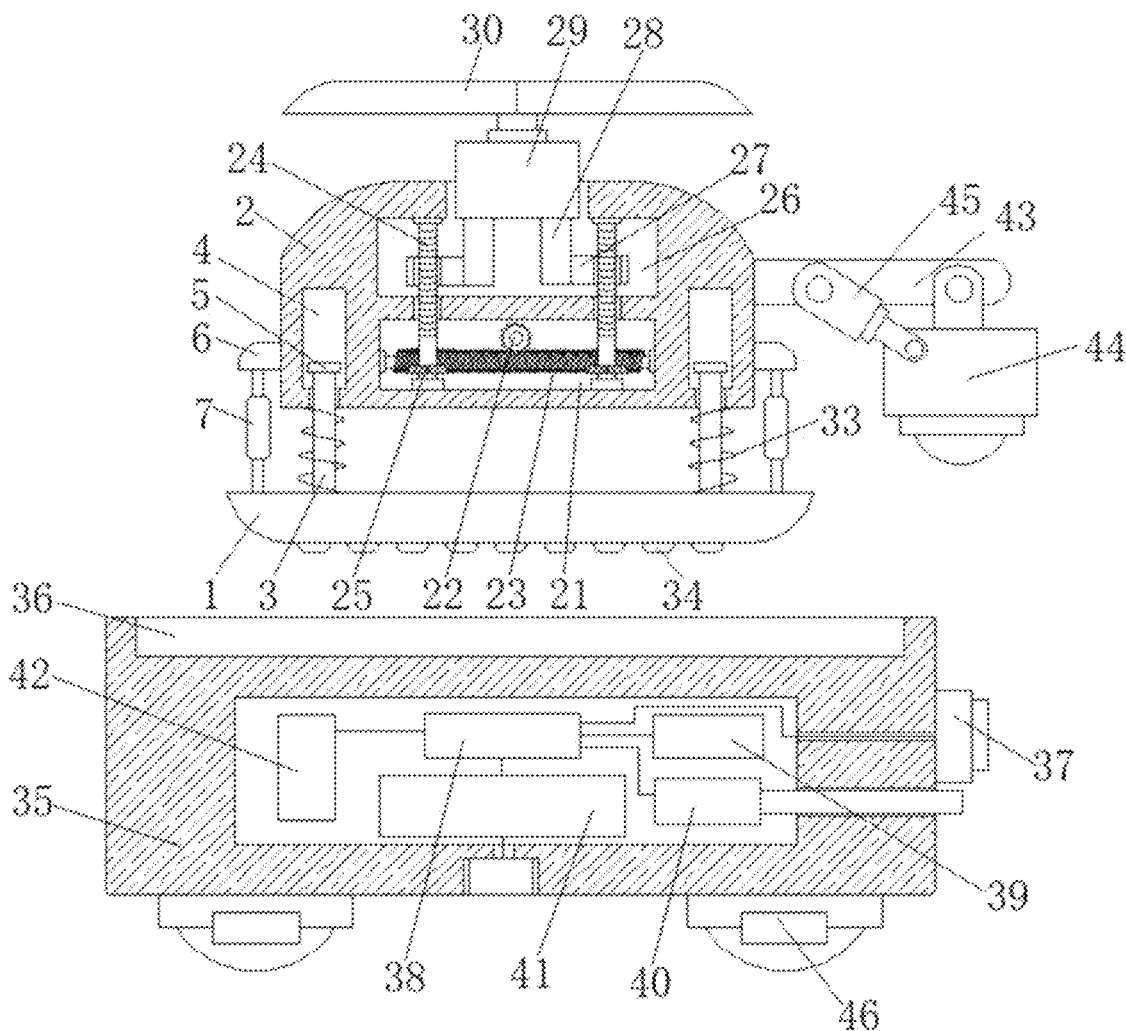
FIG. 2 is a front-view structural schematic diagram of an air-ground integrated landslide monitoring device provided by the present disclosure.
Figure 3:
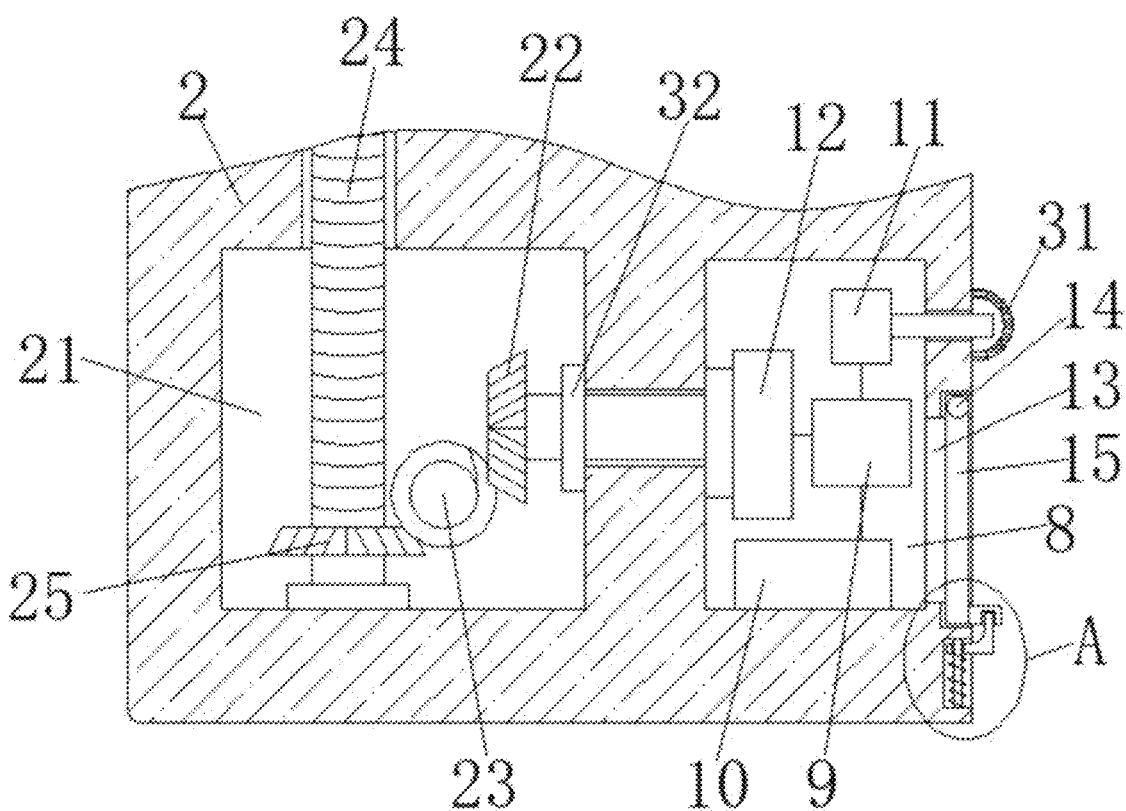
FIG. 3 is a side-view structural schematic diagram of a cavity of an air-ground integrated landslide monitoring device provided by the present disclosure.
Figure 4:
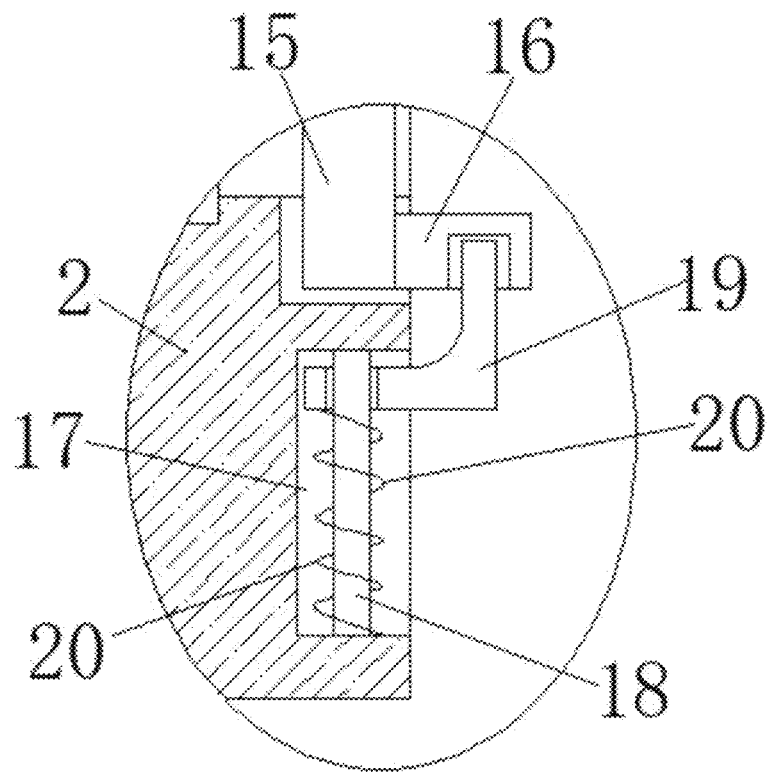
FIG. 4 is a structural schematic diagram of part A in FIG. 3.
Figure 5:
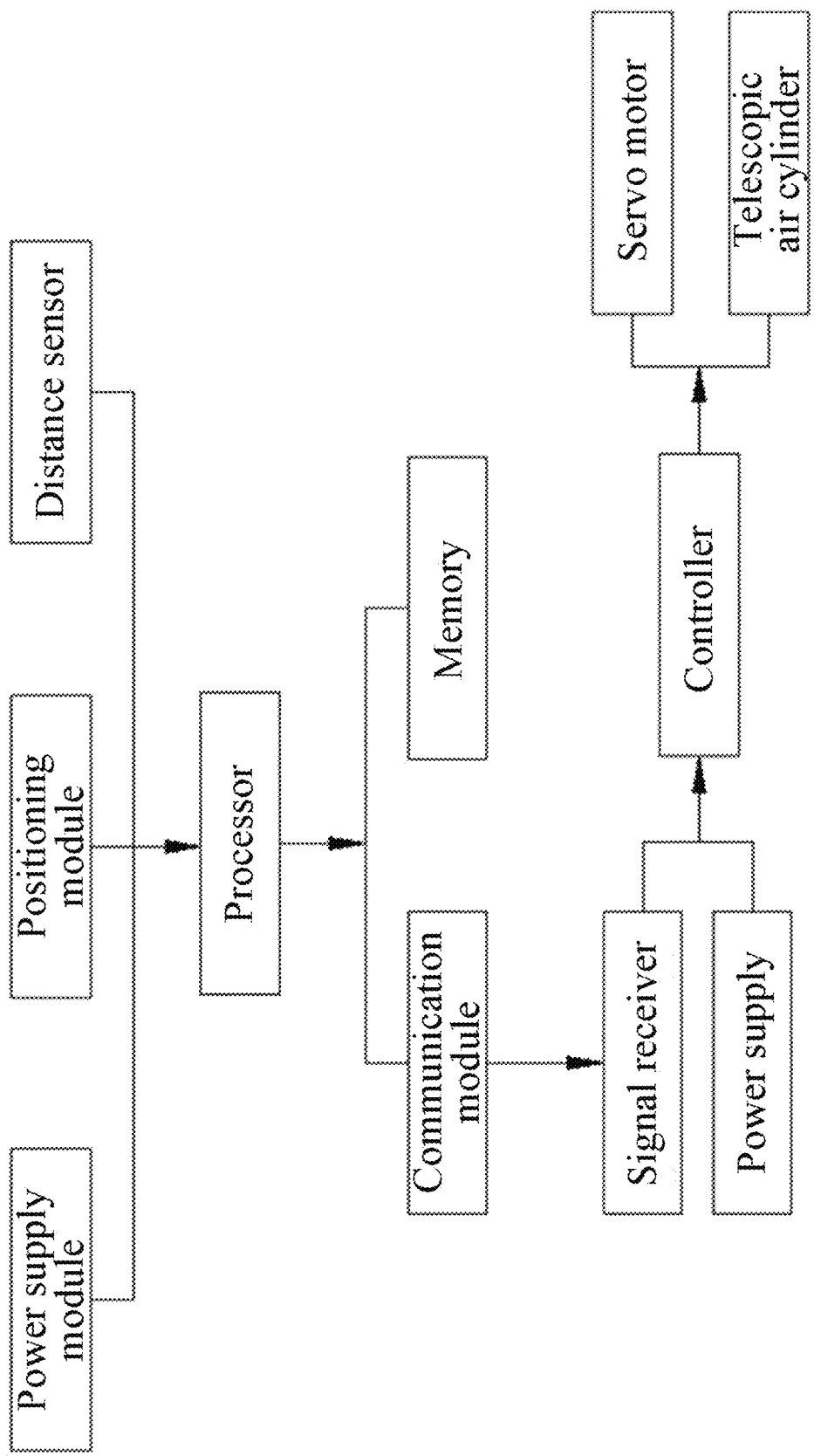
FIG. 5 is a control system schematic diagram of an air-ground integrated landslide monitoring device provided by the present disclosure.

Referring to FIG. 1, an air-ground integrated landslide monitoring method comprises the following steps:

step one, performing high-precision (centimeter-level) vertical aerial photogrammetry and oblique photogrammetry on a monitored area by using an unmanned aerial vehicle 2, and quickly generating a digital topographic map, a digital orthographic map and a digital surface model;

step two, performing accurate and intensive monitoring on the monitored area through a monitoring device located on a control box 35 on the ground; and step three, finally sending data obtained from the ground monitoring device and aerial photography of the unmanned aerial vehicle 2 to a monitoring information processor, and after the monitoring data are processed by the processor 38, sending the data to a remote-control center through a communication module 40, so that real-time transformation and spatialization of dynamic landslide monitoring information are achieved.

In the present disclosure, the unmanned aerial vehicle 2 can adjust the shooting angle of a camera 44 to perform all-around and high-precision vertical aerial photogrammetry and oblique photogrammetry on the monitored area.

In the present disclosure, the obtained air-ground monitoring data are transmitted to the monitoring information real-time processor.

In the present disclosure, referring to FIG. 2 to FIG. 5, an air-ground integrated landslide monitoring device comprises a control box 35, a bottom plate 1 and an unmanned aerial vehicle 2. The bottom of the control box 35 is rotatably connected with a plurality of universal self-locking wheels 46. The unmanned aerial vehicle 2 is horizontally arranged above the bottom plate 1. The top of the control box 35 is provided with a supporting groove 36 corresponding to the bottom plate 1. One end of the control box 35 is fixedly connected with a distance sensor 37 for performing landslide monitoring. The control box 35 is internally provided with a processor 38, a memory 39, a communication module 40, a power supply module 41 and a positioning module 42. The top of the bottom plate 1 is fixedly connected with a plurality of symmetrically arranged guide rods 3 for supporting the unmanned aerial vehicle 2. A sliding cavity 4 corresponding to the guide rod 3 is formed in the bottom of the unmanned aerial vehicle 2. The end, located in the sliding cavity 4, of the guide rod 3 is fixedly connected with a clamping block 5 for preventing the guide rod 3 from falling off from the interior of the sliding cavity 4. The bottom of the unmanned aerial vehicle 2 is fixedly connected with a plurality of supporting blocks 6 for supporting turnbuckles. The supporting block 6 is connected with the top of the bottom plate 1 through a turnbuckle 7 for folding the bottom plate 1.

In the present disclosure, one side of the unmanned aerial vehicle 2 is fixedly connected with a bearing rod 43 for supporting a camera 44. The bottom of the bearing rod 43 is rotatably connected with the camera 44 for performing landslide monitoring in air. The camera 44 is connected with the bearing rod 43 through a telescopic air cylinder 45 for adjusting the angle of the camera 44. The two ends of the telescopic air cylinder 45 are rotatably connected with the camera 44 and the bearing rod 43 respectively.

In the present disclosure, a device cavity 8 is formed in one side of the unmanned aerial vehicle 2 and used for setting various control elements. A controller 9, a power supply 10, a signal receiver 11 and a servo motor 12 are sequentially arranged in the device cavity 8. The output end of the controller 9 is connected with the input ends of the servo motor 12 and the telescopic air cylinder 45 for controlling the servo motor 12. The output ends of the power supply 10 and the signal receiver 11 are both connected with the input end of the controller 9 for sending signals to the controller. The output ends of the power supply module 41, the positioning module 42 and the distance sensor 37 are all connected with the input end of the processor 33 for sending monitoring signals to the processor. The output end of the processor 33 is respectively connected with the input ends of the communication module 40 and the memory 39. The output end of the communication module 40 is connected with the input end of the signal receiver 11.

In the present disclosure, a through hole 13 is formed in the inner wall of the device cavity 8. A baffle plate 15 is rotatably connected into the through hole 13 through a rotating shaft 14. Control elements in the device cavity 8 are protected. A locking block 16 is fixedly connected to the end, away from the rotating shaft 14, of the baffle plate 15 for fixing the baffle plate. A sliding groove 17 is formed in the outer wall of the unmanned aerial vehicle 2. A sliding rod 18 is fixedly connected to the sliding groove 17 for supporting an L-shaped clamping rod 19. The sliding rod 18 is slidably sleeved with the L-shaped clamping rod 19. A clamping groove corresponding to the L-shaped clamping rod 19 is formed in the locking block 16. A first spring 20 sleeves the sliding rod 18 for playing a certain elastic supporting role on the L-shaped clamping rod 19. The two ends of the first spring 20 are fixedly connected with the L-shaped clamping rod 19 and the inner wall of the sliding groove 17 respectively.

In the present disclosure, a mounting cavity 21 is formed in the side, close to the device cavity 8, of the unmanned aerial vehicle 2 and used for setting screw rods 24. The output end of the servo motor 12 penetrates through the inner wall of the device cavity 8 and extends into the mounting cavity 21. The output end of the servo motor 12 is fixedly sleeved with a first gear 22 for driving a worm to rotate. The worm 23 meshed with the first gear 22 is rotatably connected to the mounting cavity 21. Two symmetrically arranged screw rods 24 are rotatably connected into the mounting cavity 21 and used for driving transmission blocks 27 to move. The screw rod 24 is fixedly sleeved with a second gear 25 meshed with the worm 23 and used for driving the screw rod 24 to rotate.

In the present disclosure, a mounting groove 26 is formed in the top of the unmanned aerial vehicle 2. The end, away from the second gear 25, of the screw rod 24 penetrates through the inner wall of the mounting cavity 21 and extends into the mounting groove 26. The extending end of the screw rod 24 is rotatably connected with the inner top of the mounting groove 26. The end, located in the mounting groove 26, of the screw rod 24 is fixedly connected with a transmission block 27 for driving the supporting rod 28 to move. The end, away from the screw rod 24, of the transmission block 27 is fixedly connected with a supporting rod 28 for driving the driving motor 29 to move. The tops of the two supporting rods 28 are fixedly connected through a driving motor 29 for driving a rotor wing 30 to rotate. The input end of the driving motor 29 is fixedly connected with the rotor wing 30.

In the present disclosure, the output end of the signal receiver 11 is fixedly sleeved with a protective sleeve 31 for protecting the signal receiver 11. A torsion spring sleeves the rotating shaft 14. The two ends of the torsion spring are fixedly connected with the baffle plate 15 and the inner wall of the through hole 13 respectively for playing a certain torsional supporting role on the baffle plate 15. The model of the controller 9 is 80S51, so that the signal processing capability of the controller 9 is enhanced. The output end of the servo motor 12 is rotatably sleeved with a supporting sleeve 32. One side of the supporting sleeve 32 abuts against the inner wall of the mounting cavity 21 to prevent the output end of the servo motor to shake. The signal receiver 11 is an infrared wireless transmitter, so that the signal receiving intensity of the signal receiver 11 is enhanced. A second spring 33 sleeves the guide rod 3. The two ends of the second spring 33 are fixedly connected with the bottom plate 1 and the unmanned aerial vehicle 2 respectively for playing a certain elastic supporting role on the unmanned aerial vehicle 2. The bottom of the bottom plate 1 is fixedly connected with a plurality of protruding blocks 34 to prevent the bottom plate 1 from sliding.

In the present disclosure, firstly, the controller 9 drives the servo motor 12 to be opened. At the moment, the servo motor 12 drives the worm 23 to rotate through the first gear 22. Meanwhile, the worm 23 drives the screw rod 24 to rotate through the second gear 25 so as to drive the transmission block 27 to move. Meanwhile, the transmission block 27 drives the driving motor 29 to move up and down through the supporting rod 28 to be folded or unfolded. Meanwhile, the distance between the bottom plate 1 and the unmanned aerial vehicle 2 can be adjusted through the turnbuckle 7. Meanwhile, the guide rod 3 effectively prevents the bottom plate 1 from shaking.

In the present disclosure, the second spring 33 can play a certain elastic supporting role on the bottom plate 1, and meanwhile, the clamping block 5 can prevent the guide rod 3 from falling off from the interior of the sliding cavity 4. When the rotor wing 30 needs to be folded, the signals can be sent to the signal receiver 11, and meanwhile, the signal receiver 11 controls the servo motor 12 through the controller 9. Meanwhile, the supporting sleeve 32 can effectively prevent the output end of the servo motor 29 from shaking. Meanwhile, the L-shaped clamping rod 19 can be pulled, then the baffle plate 15 is opened, and the control elements in the device cavity 8 are maintained. Meanwhile, the torsion spring can play a certain torsional supporting role on the baffle plate 15. The protective sleeve 31 can play a certain protection role on the signal receiver 11, and meanwhile, the first spring 20 can play a certain elastic supporting role on the L-shaped clamping rod 19.

In the present disclosure, firstly, the unmanned aerial vehicle 2 is adjusted through the devices such as turnbuckles 7, then the unmanned aerial vehicle 2 is remotely controlled through the communication module 40 and the signal receiver 11, the angle of the camera 44 is adjusted, and finally the landslide condition is monitored from the air through the camera 44 on the unmanned aerial vehicle 2. At the same time, the landslide situation is monitored from the ground by the distance sensor 37.

The above-mentioned are only preferred specific embodiments of the present disclosure. However, the scope of protection of the present disclosure is not limited to the embodiments described herein. Any technicians skilled in the technical field are within the technical scope disclosed by the present disclosure; and any replacements or modifications according to the technical schemes of the present disclosure and ideas thereof shall be included in the scope of protection of the present disclosure.

What is claimed is:

1. An air-ground integrated landslide monitoring device, comprising a control box (35), a bottom plate (1) and an unmanned aerial vehicle (2), and the unmanned aerial vehicle (2) being horizontally arranged above the bottom plate (1), wherein the top of the control box (35) is provided with a supporting groove (36) corresponding to the bottom plate (1), one end of the control box (35) is fixedly connected with a distance sensor (37), the control box (35) is internally provided with a processor (38), a memory (39), a communication module (40), a power supply module (41) and a positioning module (42), the top of the bottom plate (1) is fixedly connected with a plurality of symmetrically arranged guide rods (3), a sliding cavity (4) corresponding to the guide rod (3) is formed in the bottom of the unmanned aerial vehicle (2), the end, located in the sliding cavity (4), of the guide rod (3) is fixedly connected with a clamping block (5), the bottom of the unmanned aerial vehicle (2) is fixedly connected with a plurality of supporting blocks (6), the supporting block (6) is connected with the top of the bottom plate (1) through a turnbuckle (7), one side of the unmanned aerial vehicle (2) is fixedly connected with a bearing rod (43), the bottom of the bearing rod (43) is rotatably connected with a camera (44), the camera (44) is connected with the bearing rod (43) through a telescopic air cylinder (45), and the two ends of the telescopic air cylinder (45) are rotatably connected with the camera (44) and the bearing rod (43) respectively;

a device cavity (8) is formed in one side of the unmanned aerial vehicle (2), a controller (9), a power supply (10), a signal receiver (11) and a servo motor (12) are sequentially arranged in the device cavity (8), the output end of the controller (9) is connected with the input ends of the servo motor (12) and the telescopic air cylinder (45), the output ends of the power supply (10) and the signal receiver (11) are both connected with the input end of the controller (9), the output ends of the power supply module (41), the positioning module (42) and the distance sensor (37) are all connected with the input end of the processor (33), the output end of the processor (33) is respectively connected with the input ends of the communication module (40) and the memory (39), and the output end of the communication module (40) is connected with the input end of the signal receiver (11);

a through hole (13) is formed in the inner wall of the device cavity (8), a baffle plate (15) is rotatably connected into the through hole (13) through a rotating shaft (14), a locking block (16) is fixedly connected to the end, away from the rotating shaft (14), of the baffle plate (15), a sliding groove (17) is formed in the outer wall of the unmanned aerial vehicle (2), a sliding rod (18) is fixedly connected into the sliding groove (17), the sliding rod (18) is slidably sleeved with an L-shaped clamping rod (19), a clamping groove corresponding to the L-shaped clamping rod (19) is formed in the locking block (16), the sliding rod (18) is provided with a first spring (20), and the two ends of the first spring (20) are fixedly connected with the L-shaped clamping rod (19) and the inner wall of the sliding groove (17) respectively;

a mounting cavity (21) is formed in the side, close to the device cavity (8), of the unmanned aerial vehicle (2), the output end of the servo motor (12) penetrates through the inner wall of the device cavity (8) and extends into the mounting cavity (21), the output end of the servo motor (12) is fixedly sleeved with a first gear (22), a worm (23) meshed with the first gear (22) is rotatably connected into the mounting cavity (21), two symmetrically arranged screw rods (24) are rotatably connected into the mounting cavity (21), and the screw rod (24) is fixedly sleeved with a second gear (25) meshed with the worm (23); and a mounting groove (26) is formed in the top of the unmanned aerial vehicle (2), the end, away from the second gear (25), of the screw rod (24) penetrates through the inner wall of the mounting cavity (21) and extends into the mounting groove (26), the extending end of the screw rod (24) is rotatably connected with the inner top of the mounting groove (26), the end, located in the mounting groove (26), of the screw rod (24) is fixedly connected with a transmission block (27), the end, away from the screw rod (24), of the transmission block (27) is fixedly connected with a supporting rod (28), the tops of the two supporting rods (28) are fixedly connected through a driving motor (29), and the input end of the driving motor (29) is fixedly connected with a rotor wing (30).

2. The air-ground integrated landslide monitoring device according to claim 1, wherein the output end of the signal receiver (11) is fixedly sleeved with a protective sleeve (31).

3. The air-ground integrated landslide monitoring device according to claim 1, wherein a torsion spring sleeves the rotating shaft (14), and the two ends of the torsion spring are fixedly connected with the baffle plate (15) and the inner wall of the through hole (13) respectively.

4. The air-ground integrated landslide monitoring device according to claim 1, wherein the output end of the servo motor (12) is rotatably sleeved with a supporting sleeve (32), and one side of the supporting sleeve (32) abuts against the inner wall of the mounting cavity (21).

5. The air-ground integrated landslide monitoring device according to claim 1, wherein the signal receiver (11) is an infrared wireless transmitter.

6. The air-ground integrated landslide monitoring device according to claim 1, wherein a second spring (33) is arranged on the guide rod (3), and the two ends of the second spring (33) are fixedly connected with the bottom plate (1) and the unmanned aerial vehicle (2) respectively.

7. The air-ground integrated landslide monitoring device according to claim 1, wherein the bottom of the bottom plate (1) is fixedly connected with a plurality of protruding blocks (34).

8. The air-ground integrated landslide monitoring device according to claim 1, wherein the bottom of the control box (35) is rotatably connected with a plurality of universal self-locking wheels (46).

\* \* \* \* \*